Patented Aug. 6, 1946

2,405,267

UNITED STATES PATENT OFFICE 2,405,267

3,6-EPOXYCYCLOHEXENE

Walter Nudenberg, Chicago, Ill., assignor to United States of America as represented by the Secretary of Agriculture No Drawing. Application October 27, 1944, Serial No. 560,589

1 Claim. (Cl. 260—333)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to chemical intermediates and more particularly to 3,6-epoxycyclohexene, a new and versatile intermediate in synthesis.

3,6-epoxycyclohexene is a representative of an entirely new class of compounds. No other inner ether of a cyclo-olefin is known. The most closely related compound heretofore known is the plant product ascaridole, which is used as an anthelmintic, usually in the form of oil of chenopodium.

In U. S. 2,349,232, a method is disclosed for forming a variety of alicyclic compounds by reacting ethylene with a conjugated or 1,3-diene. The reaction is described as proceeding by a 1,4-addition of the ethylene to the diene, whereby the alicyclic compound produced has, in each case, one more six-membered ring than the starting diene.

I have now found that the above-described method can be extended to form the inner ether, 3,6-epoxycyclohexene. I accomplish this result by reacting ethylene with furan under the influence of heat and pressure. The reaction may be indicated as follows:

Undesirable dimerization and polymerization during the reaction may be suppressed by the addition of an agent such as hydroquinone.

The manner of practicing the present invention is illustrated by the following example:

Into a mixture of 30–35 g. of furan and a few crystals of hydroquinone sealed in a rocking-type autoclave, ethylene was introduced in two or three portions with intermittent shaking up to an initial pressure of 1100–1200 lb. per sq. in. at room temperature. The autoclave was heated to 155° C. and kept at 150°–155° C., the pressure dropping and ultimately becoming constant after 16 hours. After cooling the autoclave, the gas was allowed to escape through a trap cooled by solid carbon dioxide, and the deposited furan was returned to the reaction mixture. The whole was distilled in three fractions: the first, of unreacted furan, 14–16 g.; the second, B. P. 40°–118° C., chiefly furan, 1.5 g.; the third, a colorless liquid, B. P. 118°–122° C., 1.2–1.5 g. This last fraction was 3,6-epoxycyclohexene, B. P. 118°–119° C., $n_D^{20}$ 1.4629; yield 5 to 8 percent on the basis of the furan consumed.

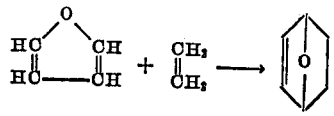

Having thus described my invention, I claim: 3,6-epoxycyclohexene.

WALTER NUDENBERG.